US012396528B1

(12) United States Patent
Carroll

(10) Patent No.: US 12,396,528 B1
(45) Date of Patent: Aug. 26, 2025

(54) TAMPER-PROOF WEARABLE DEVICE AND SYSTEM THEREOF

(71) Applicant: Taishah Amiyra Carroll, Clifton Heights, PA (US)

(72) Inventor: Taishah Amiyra Carroll, Clifton Heights, PA (US)

(73) Assignees: Taishah A. Carroll, Clifton Heights, PA (US); Ari Blyss Kamala, Clifton Heights, PA (US)

( * ) Notice: Subject to any disclaimer, the term of this patent is extended or adjusted under 35 U.S.C. 154(b) by 0 days.

(21) Appl. No.: 18/204,830

(22) Filed: Jun. 1, 2023

Related U.S. Application Data

(60) Provisional application No. 63/348,202, filed on Jun. 2, 2022.

(51) Int. Cl.
*E05B 73/00* (2006.01)
*A44C 7/00* (2006.01)
(Continued)

(52) U.S. Cl.
CPC ............ *A44C 7/001* (2013.01); *B65D 51/002* (2013.01); *B65D 81/3205* (2013.01); *E05B 73/0017* (2013.01)

(58) Field of Classification Search
CPC G08B 13/2434; G08B 15/02; G08B 21/0269; G08B 21/0288; G08B 13/19684; G08B 13/2445; G08B 15/004; G08B 21/0202; G08B 21/0205; G08B 21/0252; G08B 21/0261; G08B 21/0275; G08B 21/028; G08B 21/0283; G08B 21/0291; G08B 25/016; E05B 73/0017; E05B 47/0004; E05B 47/0005; E05B 39/002; E05B 15/04; E05B 51/005; E05B 47/0002; Y10T 436/25; H04L 2209/80; H04L 2209/84; H04L 2209/88; H04L 63/0428; H04L 63/101; H04L 9/3226; G16H 10/60; G16H 10/65; G06Q 40/08; G06K 19/06037; G06K 19/0776; G06K 7/1417; G01S 5/0072; F41H 9/10; A41D 1/002; H04W 4/029; H04W 12/00; H04W 12/02; H04W 12/08; H04W 12/77; H04W 48/08;
(Continued)

(56) References Cited

U.S. PATENT DOCUMENTS 6,277,646 B1 * 8/2001 Guirguis ................ B01L 3/502
422/417
7,414,535 B2 8/2008 Hanabusa et al.
(Continued)

FOREIGN PATENT DOCUMENTS

WO 9308712 A1 5/1993

*Primary Examiner* — Dionne Pendleton

(57) ABSTRACT

A device configured to be worn by a user is described. The device comprises a first member having an opening and a second member configured to be detachably engaged with the first member. The device further comprises a chamber comprising liquid ink, the liquid ink being in fluid communication with the opening via a passage extending between the chamber and the opening. The device further comprises a locking mechanism configured to switch between a locked state and an unlocked state, and an ejection module configured to eject the liquid ink through the opening of the first member when the locking mechanism is at the locked state thereof.

18 Claims, 8 Drawing Sheets

(51) Int. Cl.
*B65D 51/00* (2006.01)
*B65D 81/32* (2006.01)

(58) Field of Classification Search
CPC ........ H04W 48/16; H04W 64/00; A44C 7/00; G07G 3/003; G07F 19/205; G01N 2001/007; E05G 1/12; E05G 5/00; B01L 3/502; A61B 10/007; A61B 2010/0009; G07D 11/125; G07D 11/225; G07D 11/40; G07D 9/00
See application file for complete search history.

(56) References Cited

U.S. PATENT DOCUMENTS

| | | | | |
|---|---|---|---|---|
| 2007/0074043 | A1 | 3/2007 | Lacey | |
| 2007/0171047 | A1 | 7/2007 | Goodman et al. | |
| 2009/0058659 | A1 * | 3/2009 | Handyside | G08B 15/02 340/572.9 |
| 2014/0118149 | A1 | 5/2014 | Elias | |
| 2017/0132899 | A1 | 5/2017 | Theocharous | |
| 2019/0114887 | A1 | 4/2019 | Brantley | |
| 2020/0347647 | A1 * | 11/2020 | Lindholm | E05B 15/04 |
| 2021/0297813 | A1 | 9/2021 | Camp | |

* cited by examiner

TAMPER-PROOF WEARABLE DEVICE AND SYSTEM THEREOF

CROSS-REFERENCE TO RELATED APPLICATION

This application claims the benefit of U.S. Provisional Patent Application 63/348,202, filed Jun. 2, 2022, which is hereby incorporated by reference herein in its entirety.

FIELD OF THE INVENTION

The present invention relates generally to wearable devices, and more particularly to a tamper-proof tracking device that is worn by a user.

BACKGROUND OF THE INVENTION

Conventionally, devices to keep a track of human movement are known. The devices can be carried by a person, such as an adult or a child. Tracking devices may be bulky and inconvenient to carry all the time. Moreover, a person may misplace the tracking devices and it becomes impossible to track the person from a remote location. Some tracking devices can be attached to clothes or accessories of a person; however, such tracking devices are not tamper-proof. Any unauthorized user can mishandle the tracking devices thereby nullifying the purpose of the tracking devices.

These drawbacks in tracking devices are extremely significant in cases of human trafficking. It is a challenge nowadays for officials and even general public to identify victims and/or culprits of human trafficking. With known devices, officials and guardians of a person can at most track the movement of the person. However, in case a person is abducted and being taken to other places, such as via an airport, the known devices do not allow general public and officials present at the airport to easily identify the victims and/or culprits. Moreover, the culprits can easily deactivate the known devices which further increases the difficulty to prevent human trafficking.

Accordingly, there is an established need for a solution to the problems mentioned above. For instance, there is an established need for a device that is tamper-proof such that the device cannot be deactivated by an unauthorized user. Further, there is an established need for a device that allows onlookers to identify the victims and/or culprits. Further, there is an established need for a device that can be easily and conveniently worn by a user. Further, there is an established need for a device that can be controlled by the user for locking and unlocking purposes, and additionally, can be tracked by a remote user.

SUMMARY OF THE INVENTION

The present invention relates to a wearable device configured to be worn by a user. The device comprises a first member having an opening and a second member configured to be detachably engaged with the first member. The device further comprises a chamber comprising liquid ink, the liquid ink being in fluid communication with the opening via a passage extending between the chamber and the opening. The device further comprises a locking mechanism configured to switch between a locked state and an unlocked state; and an ejection module configured to eject the liquid ink through the opening of the first member when the locking mechanism is at the locked state thereof. Thus, the wearable device the inhibits episodes of tampering when worn by an individual.

In an aspect, when the locking mechanism is at the locked state, the first member is prevented from disengaging with the second member. In an aspect, when the locking mechanism is at the unlocked state, the first member is allowed to disengage from the second member.

In an aspect, the present invention relates to a system comprising the wearable device and a user device communicatively coupled to the wearable device. The wearable device comprises a tracking module and the user device is configured to receive location information of the wearable device from the tracking module.

In an aspect, the system further comprises a key fob communicatively coupled to the wearable device, the key fob being configured to control switching of the locking mechanism between the locked state and the unlocked state.

In an aspect, the present invention relates to a kit comprising the wearable device and the key fob, the kit further comprising a QR code to facilitate association between the key fob and the wearable device.

In an aspect, the wearable device is a piece of jewelry.

In an aspect, the wearable device is an ear ring. In such an aspect, the first member is an ornamental piece of the ear ring, and the second member is a stopper of the ear ring. In an aspect, the ornamental piece is a stud.

In another aspect, the ejection module is operatively connected to the locking mechanism.

In another aspect, the ejection module is activated when the locking mechanism is in the locked state thereof and deactivated when the locking mechanism is in the unlocked state thereof.

In another aspect, the wearable device further comprises a tracking module configured to transmit a location of the wearable device.

In another aspect the tracking module is positioned within either the first member or the second member.

In another aspect, the ejection module is positioned within either the first member or the second member.

In another aspect, the tracking module is a Global Positioning System (GPS) module.

In another aspect, the tracking module comprises a transceiver configured to receive satellite signals and transmit location data indicative of the location of the wearable device; and a processing unit configured for analyzing the satellite signals received by the transceiver and determining the location of the wearable device.

In another aspect, the liquid ink is a permanent ink.

In another aspect, the chamber further comprises a sealing element configured to prevent the liquid ink contained within the chamber from leaking to the passage.

In another aspect, the sealing element is configured to rupture when a predetermined force is exerted thereon.

In another aspect, the sealing element is configured to have a sealed state in which fluid communication between the chamber and the liquid ink contained therein is prevented, and a ruptured state in which fluid communication between the chamber and the liquid ink contained therein is allowed.

In another aspect the ejection module comprises a battery and an ejector coupled to the battery, wherein the ejector is configured to provide the liquid ink with sufficient energy to rupture the sealing element thereby causing a transitioning of the sealing element from the scaled state to the ruptured state.

In another aspect, the ejection module is configured to eject the liquid ink in a 360 degree pattern.

In another aspect, the wearable device is an ear ring.

These and other objects, features, and advantages of the present invention will become more readily apparent from the attached drawings and the detailed description of the embodiments and examples, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
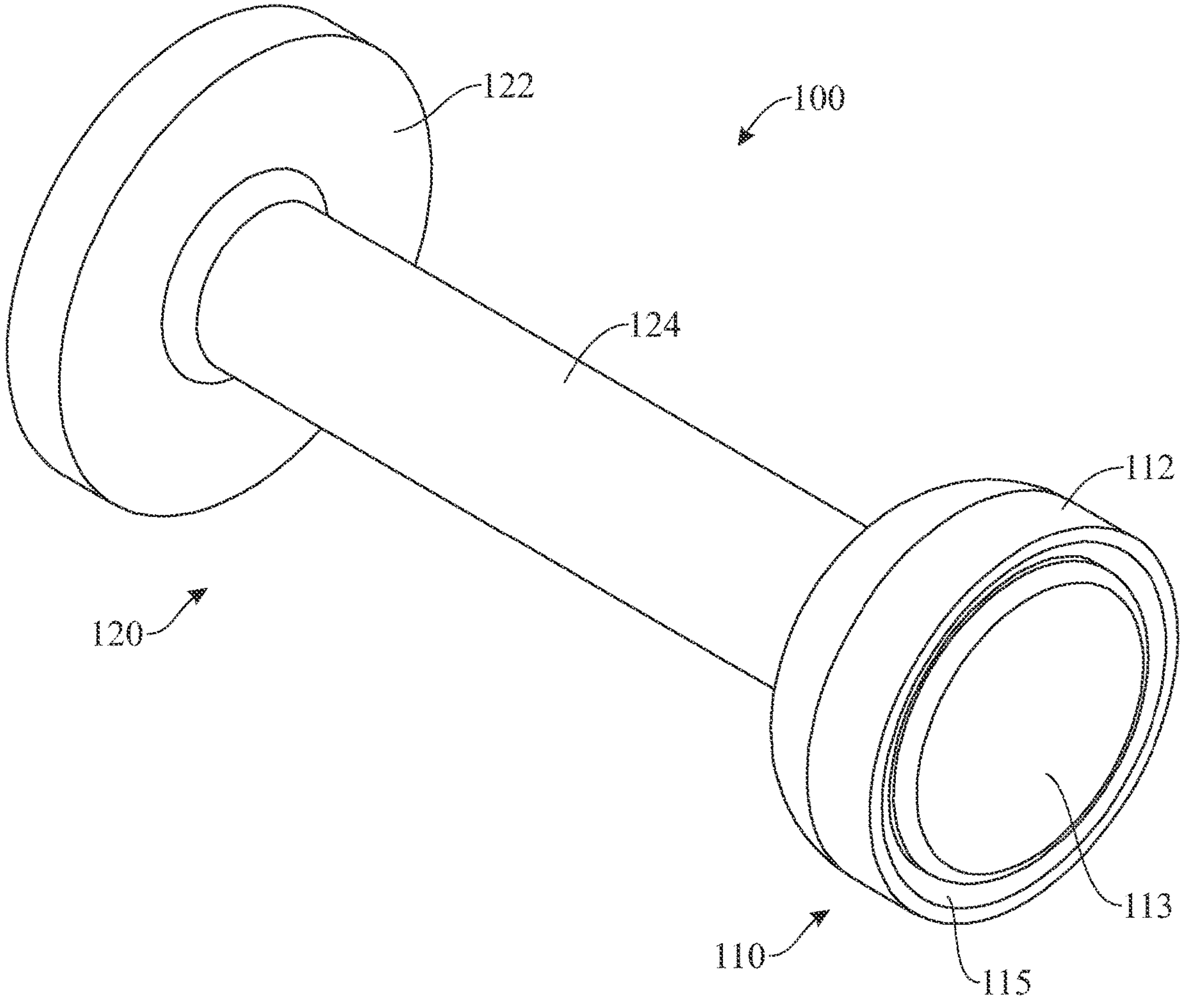
FIG. 1 illustrates a perspective view of a wearable device in an assembled state, in accordance with one embodiment of the present specification.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other embodiments. All of the embodiments described below are exemplary embodiments provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known elements associated with wearable devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

As used in this specification and the appended claims, the singular forms "a," "an," and "the" include plural referents unless the content clearly dictates otherwise, and the vice versa. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Figure 2:
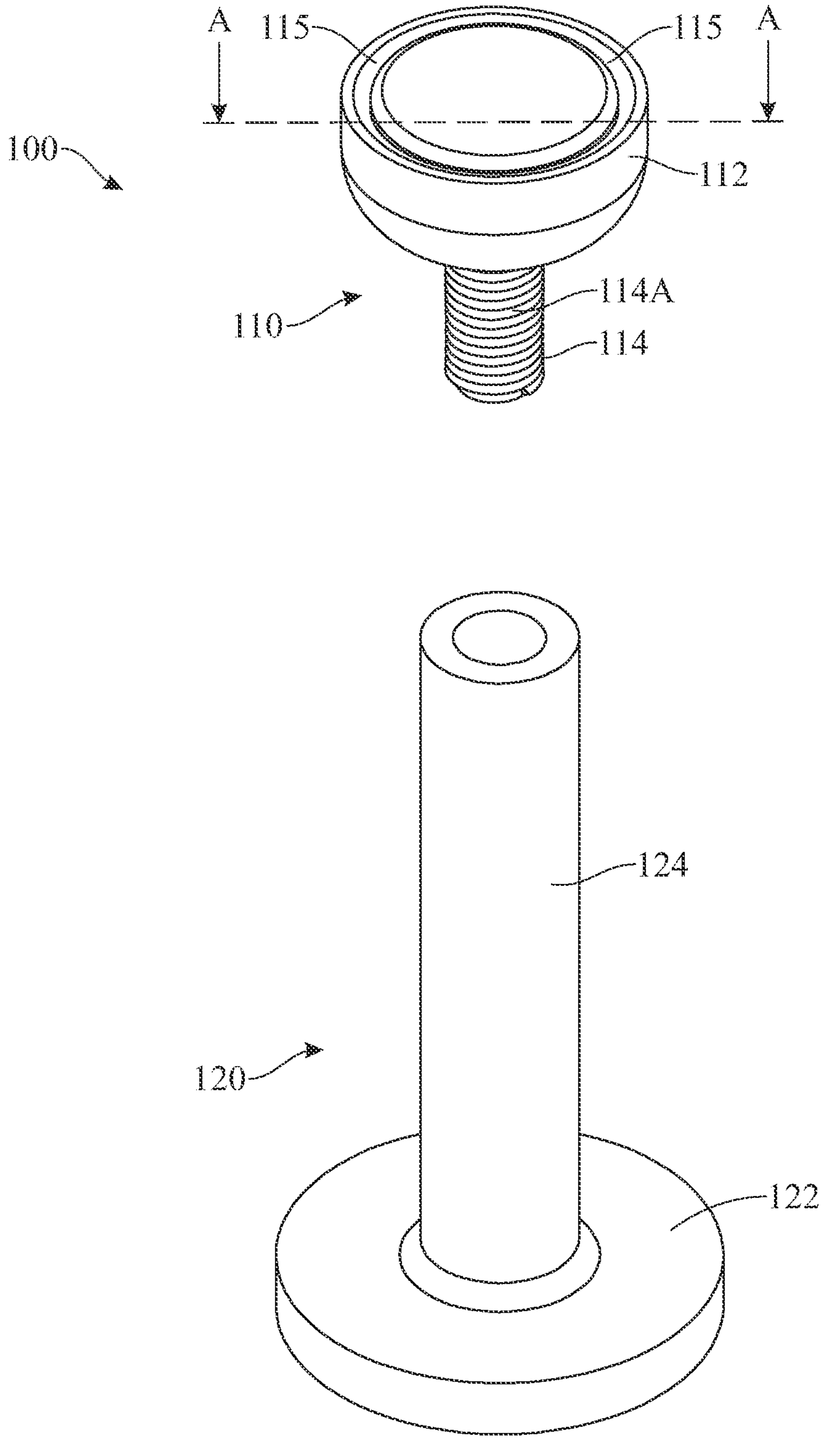
FIG. 2 illustrates a perspective view of the wearable device in a disassembled state, in accordance with one embodiment of the present specification.

Reference is initially made to FIGS. 1-2 in which FIG. 1 illustrates a perspective view of a wearable device 100 configured to be worn by a user, the wearable device 100 being in an assembled state, and FIG. 2 illustrates another perspective view of the wearable device 100, the wearable device 100 being in a disassembled state.

The term 'wearable device' as used in the present specification and claims is intended to refer to various types of devices that may be worn by a user directly (to skin) or indirectly (to fabrics and outfits). In an embodiment, the wearable device 100 is an ear ring that is worn by a user in one or both ears. The term 'user' as used in the present specification and claims refers to any person wearing the wearable device 100, such as a child, a teenager, or an adult.

In the assembled state, the wearable device 100 comprises a first member 110 and a second member 120 coupled to the first member 110. The first and second members 110, 120 can be seen as separated in the disassembled state of the wearable device 100 shown in FIG. 2. The first member 110 may be in the form of a male connector while the second member 120 may be in the form of a female connector. The wearable device 100 is thus configured to be shifted from the disassembled state to the assembled state, and selectively from the assembled state to the disassembled state.

In the illustrated embodiment, the first member 110 comprises a housing 112 and a protrusion 114 extending from the housing 112. The first member 110 is configured to be received within the second member 120, in that, the protrusion 114 is configured to be in engagement with the second member 120, thereby coupling the first member 110 to the second member 120. As seen in FIG. 2, the protrusion 114 may comprise external threading 114A configured to facilitate coupling of the protrusion 114, and thus the first member 110, to the second member 120. In an embodiment, the housing 112 and the protrusion 114 are integrally formed. In an embodiment, the housing 112 and the protrusion 114 are separately formed and joined together to form a unitary body. It is appreciated that the housing 112 and the protrusion 114 may be formed for the same material. In an example, the material is titanium alloy.

The second member 120 comprises a base 122 and a receptacle 124 extending from the base 122. The receptacle 124 is configured to receive the protrusion 114 of the first member 110 so as to facilitate coupling of the first member 110 with the second member 120. In an embodiment, the base 122 and the receptacle are integrally formed. In an embodiment, the base 122 and the receptacle are separately formed and joined together to form a unitary body. It is appreciated that the base 122 and the receptacle 124 may be formed for the same material. In an example, the material is titanium alloy.

The receptacle 124 may have dimensions corresponding to the dimensions of the protrusion 114 to allow the protrusion 114 to be securely received within the receptacle 124. The receptacle 124 may comprise internal threading (may not be seen in drawings) corresponding to the external threading 114A of the protrusion 114, the internal threading being in engagement with the external threading 114A when the first member 110 is coupled to the second member 120 and the wearable device 100 is in the assembled state thereof.

The wearable device 100 in the assembled state thereof is configured to be worn by a user. For instance, the wearable device 100 is an ear ring and a user may wear the wearable device 100 in place of a conventional car ring. The wearable device 100 in such a scenario may be designed and sized to resemble an ear ring such that a user can wear the wearable device 100. The protrusion 114 of the first member 110 may have a length so as to pass a pierced hole in an ear (e.g., earlobe) of a user when a user wears the wearable device 100. The base 122 of the second member 120 may comprise flanges so as to support the wearable device 100 and allow the wearable device 100 to be securely worn by the user.

Figure 6:
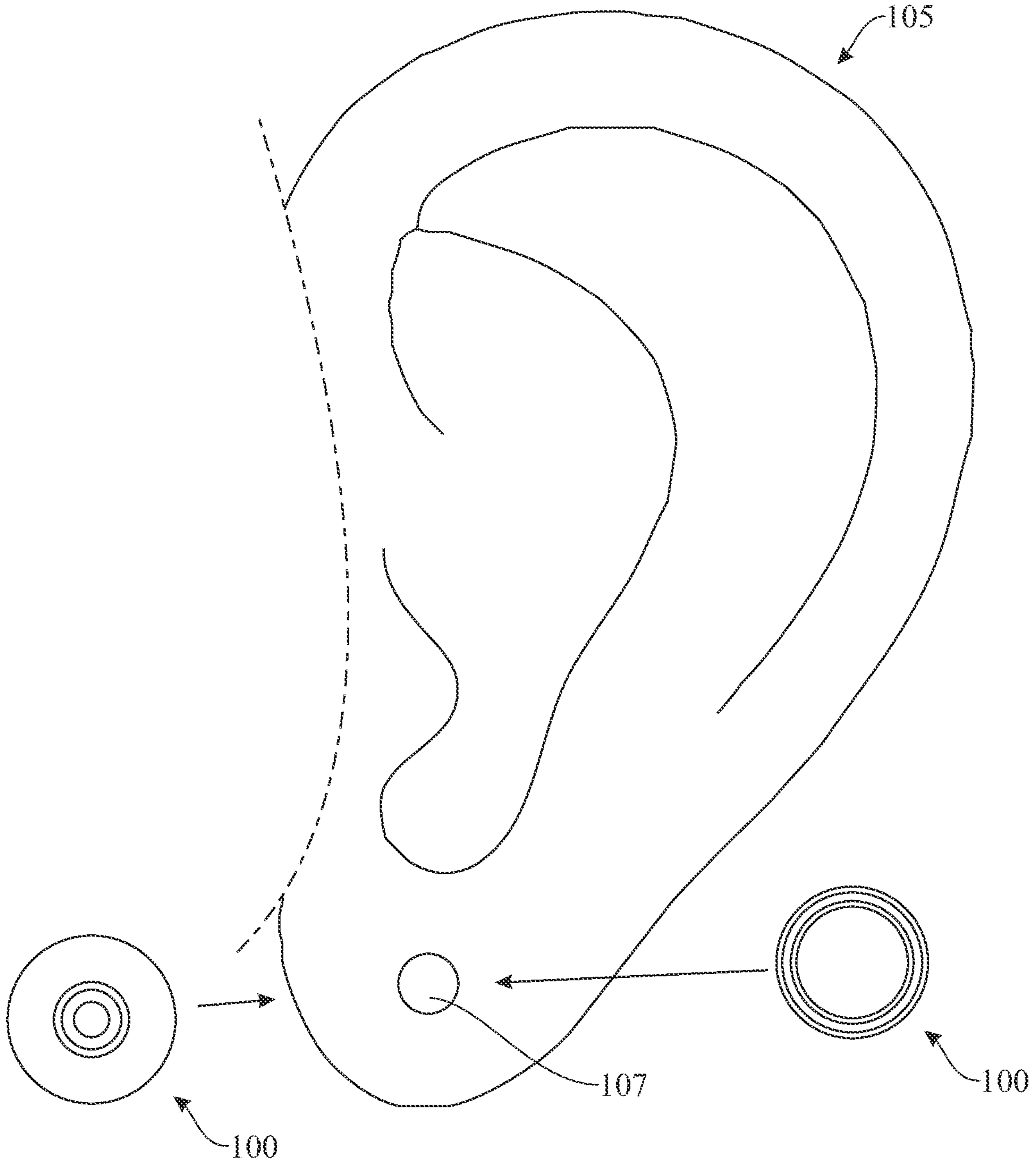
FIG. 6 illustrates the wearable device being placed into a pierced earlobe of a user, in accordance with one embodiment of the present specification.
Figure 7:
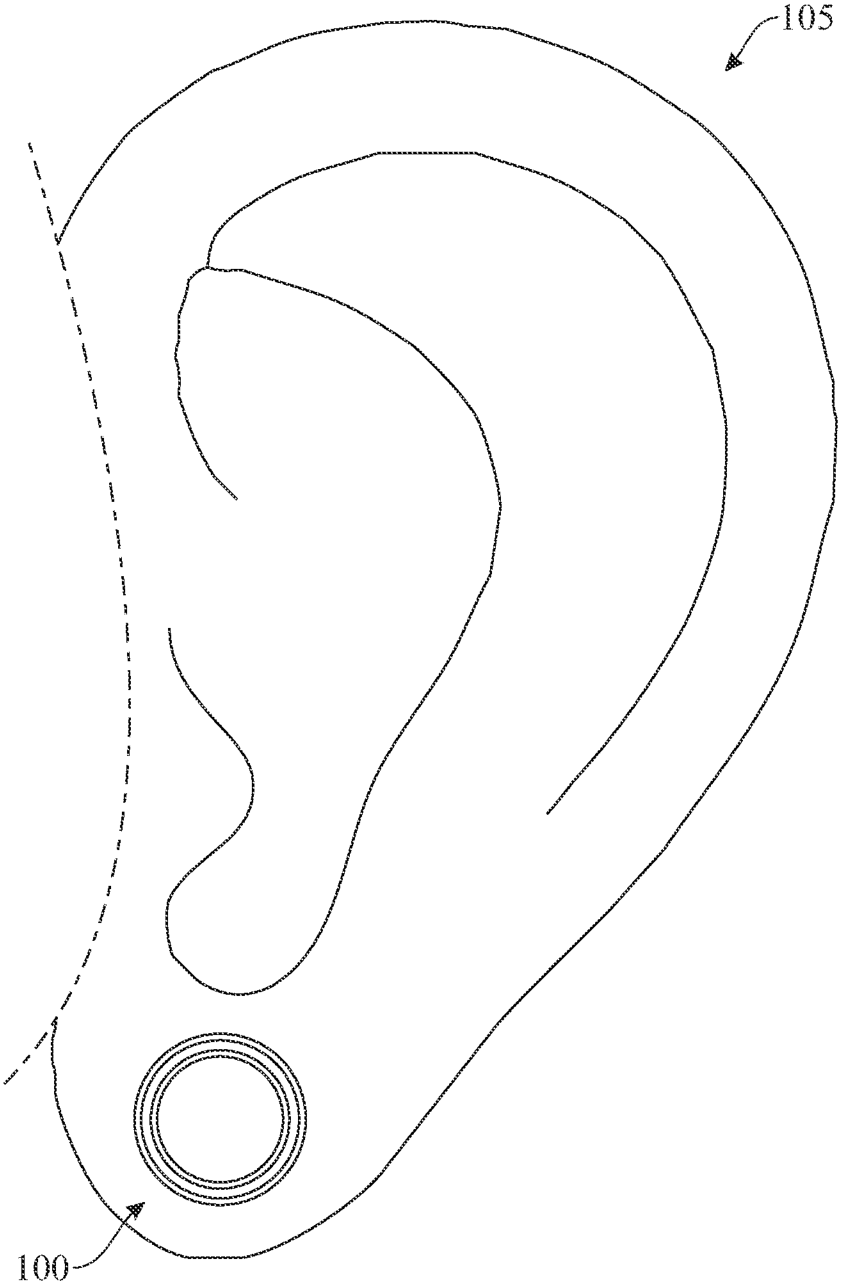
FIG. 7 illustrates the wearable device in place in the earlobe of the user, in accordance with one embodiment of the present specification.

Reference is made to FIGS. 6-7 that illustrate the wearable device 100 being an car ring. As seen in FIG. 6, the wearable device 100 is being placed into an ear 105 of a user, in that, the wearable device 100 is in a disassembled state with the first member 110 being inserted into the pierced hole 107 in the ear 105 from one side and the second member 120 being inserted into the pierced hole 107 in the ear 105 from an opposite side. The first member 110 may be inserted into the pierced hole 107 through the protrusion 114 that passes through the pierced hole 107 in the ear 105 of the user. As seen in FIG. 7, the wearable device 100 has been placed into the ear 105 and the wearable device 100 is the assembled state, the first member 110 being an external facing part of the wearable device 100. In other words, the first member 110 is an ornamental piece of the ear ring. The ornamental piece may be a stud.

The housing 112 of the first member 110 may form an external facing part of the wearable device 100, that is, the housing 112 may be visible to other users when the wearable device 100 has been worn by a user. In an embodiment, the housing 112 may be shaped to increase the aesthetic appearance of the housing 112. In an embodiment, the housing 112 may comprise or have attached thereto external elements (e.g., ornamental elements) to increase the aesthetic appearance of the housing 112. The ornamental elements may be interchangeable so as to satisfy aesthetic needs of the user wearing the wearable device 100. As described previously, the ornamental elements may comprise studs, which may be interchangeable. The user wearing the wearable device 100 may select one stud of the plurality of studs to wear at one time.

The housing 112 comprises a top surface 113 forming a part of the external facing part of the wearable device 100. As seen in FIGS. 1-2, the top surface 113 may comprise an opening 115 formed therein, the opening 115 being in fluid communication within an internal region of the housing 112, as will be detailed further below.

Figure 3:
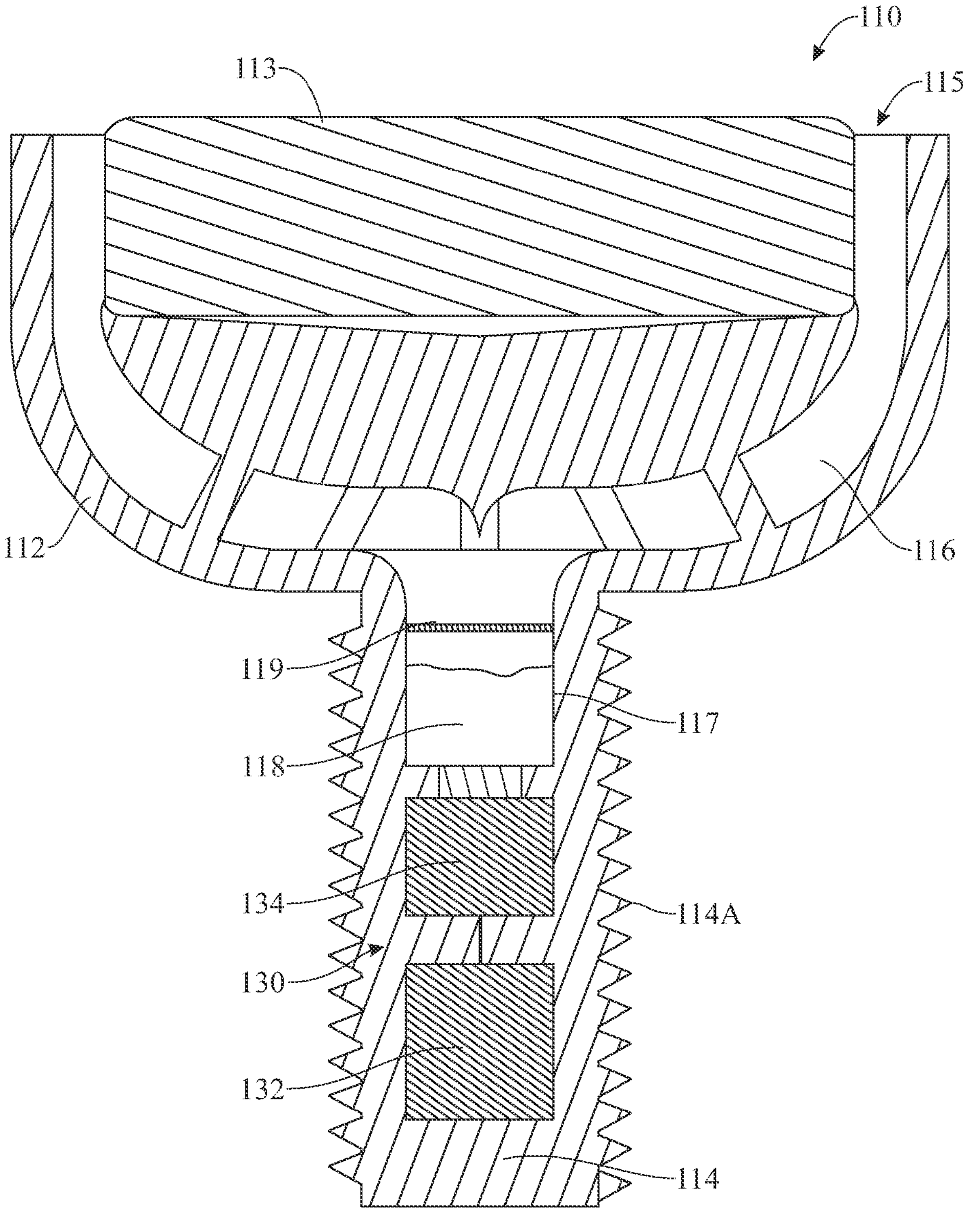
FIG. 3 illustrates a cross-sectional view of a first member of the wearable device, in accordance with one embodiment of the present specification.

Reference is now made to FIG. 3 that illustrates a cross-sectional view of the first member 110 of the wearable device 100, the cross-section being taken along line A1-A1 in FIG. 2. The housing 112 is connected to the protrusion 114, in that, the protrusion 114 extends from the housing 112. The housing 112 comprises the top surface 113 forming part of the external facing surface of the first member 110 of the wearable device 100. The housing 112 further comprises an opening 115 formed in the top surface 113.

The opening 115 is in fluid communication with an inside of the housing 112 by virtue of passage 116. That is, the housing 112 comprises passage 116 there-within, the passage 116 extending from the opening 115 to an internal of the housing 112 and being in fluid communication with an exterior of the housing 112, and thus, an exterior of the first member 110. In an embodiment, the opening 115 is a circumferential opening and the passage 116 thus forms a circumferential passage. In some embodiments, the passage 116 extends into the protrusion 114 as well, in that, the protrusion 114 may comprise a part of the passage 116, and thus, an inside of the protrusion 114 may be in fluid communication with an exterior of the housing 112 and an exterior of the first member 110.

It is appreciated that the opening 115 and the passage 116 may be of any desired configuration as long as the opening 115 facilitates the passage 116 to be in fluid communication with an exterior of the housing 112. In some embodiments, the opening 115 may be a single opening and the passage 116 may be a single passage. In an embodiment, the opening 115 may be divided into a plurality of openings and the passage 116 may be divided into a plurality of passages corresponding to the plurality of openings. For instance, the housing 112 may comprise one or more dividers and/or ribs within the opening 115 and the passage 116.

The first member 110 of the wearable device 100 comprises a chamber 117 configured to store a liquid ink 118 therein. In an embodiment, the chamber 117 may be provided at an intersection of the housing 112 and the protrusion 114 such that the chamber 117 is partly contained within the housing 112 and partly contained within the protrusion 114. In an embodiment, the chamber 117 is contained wholly within the housing 112. In an embodiment, the chamber 117 is contained wholly within the protrusion 114.

The chamber 117 is in fluid communication with the passage 116, and via the passage 116 and the opening 115, to an exterior of the first member 110. That is, the ink 118 contained within the chamber 117 may flow out of the first member 110 by virtue of the passage 116 and the opening 115. The passage 116 thus extends between the opening 115 at the housing 112 and the chamber 117 within the first member 110.

In an embodiment where the chamber 117 is provided within the housing 112, the passage 116 may extend within the housing 112, i.e., between the opening 115 and the chamber 117 provided within the housing 112. In an embodiment where the chamber 117 is provided within the protrusion 114, the passage 116 may extend within the housing 112 as well as the protrusion 114.

In an embodiment, the ink 118 may be a permanent ink. In an embodiment, the ink 118 may not be easily washable and removable. In an embodiment, the ink 118 may stain an unauthorized user and the stain may remain as it is for a plurality of days.

In an embodiment, the chamber 117 may comprise a sealing element 119 configured to prevent the ink 118 contained within the chamber 117 to leak into the passage 116. The sealing element 119 may be configured to be ruptured when a predetermined force is exerted on the sealing element 119, for instance by the ink 118, thereby bringing the ink into fluid communication with the passage 116. Accordingly, the sealing element 119 may be configured to have a sealed state in which fluid communication between the chamber 117, and the ink 118 contained therein is prevented, and a ruptured state in which fluid communication between the chamber 117, and the ink 118 contained therein is allowed.

The first member 110 comprises an ejection module 130 configured to facilitate the ink 118 in the chamber 117 to be ejected from the chamber 117 to an exterior of the first member 110 via the passage 116 and the opening 115. In an embodiment, the ejection module 130 may be positioned within the protrusion 114. In an embodiment, the ejection module 130 may be positioned within the housing 112.

The ejection module 130 is operatively connected to the chamber 117 so as to facilitate the ejection of ink 118 to an exterior of the first member 110. The ejection module 130 comprises a battery 132 and an ejector 134 coupled to the battery 132. The ejector 134 functions to eject the ink 118 from within the chamber 117 through the passage 116 and opening 115 and subsequently out of the first member 110. In some embodiments, the battery 132 may be a rechargeable battery. In some embodiments, the battery 132 may be a non-rechargeable battery that has a cycle life of years.

The ejector 134 may provide the ink 118 with sufficient energy to rupture the sealing element 119 which prevents the fluid communication between the chamber 117 and the passage 116. That is, the ejector 134 facilitates the sealing element 119 to switch from the sealed state to the ruptured state thereof. In an embodiment, the ejector 134 may operate on the principle of pumping. In an embodiment, the ejector 134 may comprise a mechanism to provide the ink 118 with kinetic energy. In this way, in accordance with the principles of the disclosed embodiments, the wearable device 100 inhibits episodes of tampering when worn by an individual.

In an embodiment, the wearable device 100 comprises a locking mechanism configured to prevent tampering of the wearable device by an unauthorized person. The wearable device 100 is thus a tamper-proof device in which the locking mechanism prevents an unauthorized person to disassemble the wearable device 100, i.e., shift the wearable device 100 from the assembled state to the disassembled state thereof. For instance, in case the first member 110 is in threaded engagement with the second member, the locking mechanism may prevent a user to unthread the engagement between the first member 110 and the second member 120.

In an embodiment, the locking mechanism is configured to switch between a locked state and an unlocked state. In the locked state, the locking mechanism prevents a user, such as an unauthorized person, to disassemble the wearable device 100. In the unlocked state, the locking mechanism allows a user to disassemble the wearable device 100. In an embodiment, the locking mechanism may shift between the locked state and the unlocked state by means of a remote device under control of an authorized user, as will be detailed further below.

In an embodiment, the ejection module 130 may be operatively connected to the locking mechanism. That is, the ejection module 130 may be activated when the locking mechanism is in the locked state thereof. In an unlocked state of the locking mechanism, the ejection module 130 is not activated. Accordingly, the ejection module 130 may not be activated when an authorized user is disassembling the wearable device 100.

In addition to the locking mechanism, the activation of the ejection module 130 is also based on unauthorized tampering of the wearable device 100 by an unauthorized person when the locking mechanism is in the locked state. For instance, in case an unauthorized person is tampering with the wearable device 100, such as by trying to disassemble the wearable device when the locking mechanism is in the locked state, the ejection module 130 is activated. In an embodiment, the wearable device 100 comprises sensing means to check unauthorized tampering by an unauthorized person.

The wearable device 100 further comprises a tracking module configured to transmit location of the wearable device 100 to an external device, such as a user device of an authorized user or user devices of known connections of the authorized user, and/or user devices of government and private agencies. In an embodiment, the tracking module is a GPS™ module. In an embodiment, the tracking module is positioned within the first member 110 of the wearable device 100. In an embodiment, the tracking module is positioned within the second member 120 of the wearable device 100. Though it is disclosed herein that the ejection module 130 and the tracking module are comprised in the first member 110 of the wearable device 100. However, it is contemplated that either or both of the ejection module 130 or the tracking module may be included in the second member 120, instead of the first member 110, of the wearable device 100.

In an embodiment, the tracking module may comprise a transceiver configured to receive satellite signals and transmit data indicative of location of the wearable device 100 to an external user device, thus allowing a user associated with the external user device to track the wearable device 100, and consequently, track a user wearing the wearable device 100.

In an embodiment, the tracking module may comprise a processing unit comprising a processor and a memory. The processor may be configured to analyze the satellite signals received by the transceiver, extract satellite data from the received signals, and determine position of the wearable device 100, such as in terms of latitude, longitude, and/or altitude. In an embodiment, the processor may use the principle of triangulation and determine the position of the wearable device 100.

The processor is in communication with the memory which may include one or more volatile or non-volatile data storage devices or may represent a data storage function of a device. For example, memory may include a non-volatile data storage device for storing programmed instructions or data for operation of the tracking module in accordance with some embodiments of the present invention. Memory may be used to store data that is generated during communication between the satellites and the tracking module as well as during processing performed by the processor. Memory may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, or the like. The machine-readable storage medium may be encoded with executable instructions.

The transceiver of the tracking module may transmit location data indicative of the position of the wearable device to an external user device, thus allowing the wearable device 100, and consequently, a user wearing the wearable device 100 to be tracked via the external user device. In an embodiment, the tracking module transmits location data at pre-determined regular intervals. In an embodiment, the pre-determined regular interval may be a few milliseconds, a few seconds, a few minutes, and the like. In some embodiments, the tracking module may be powered by the battery 132.

Figure 4:
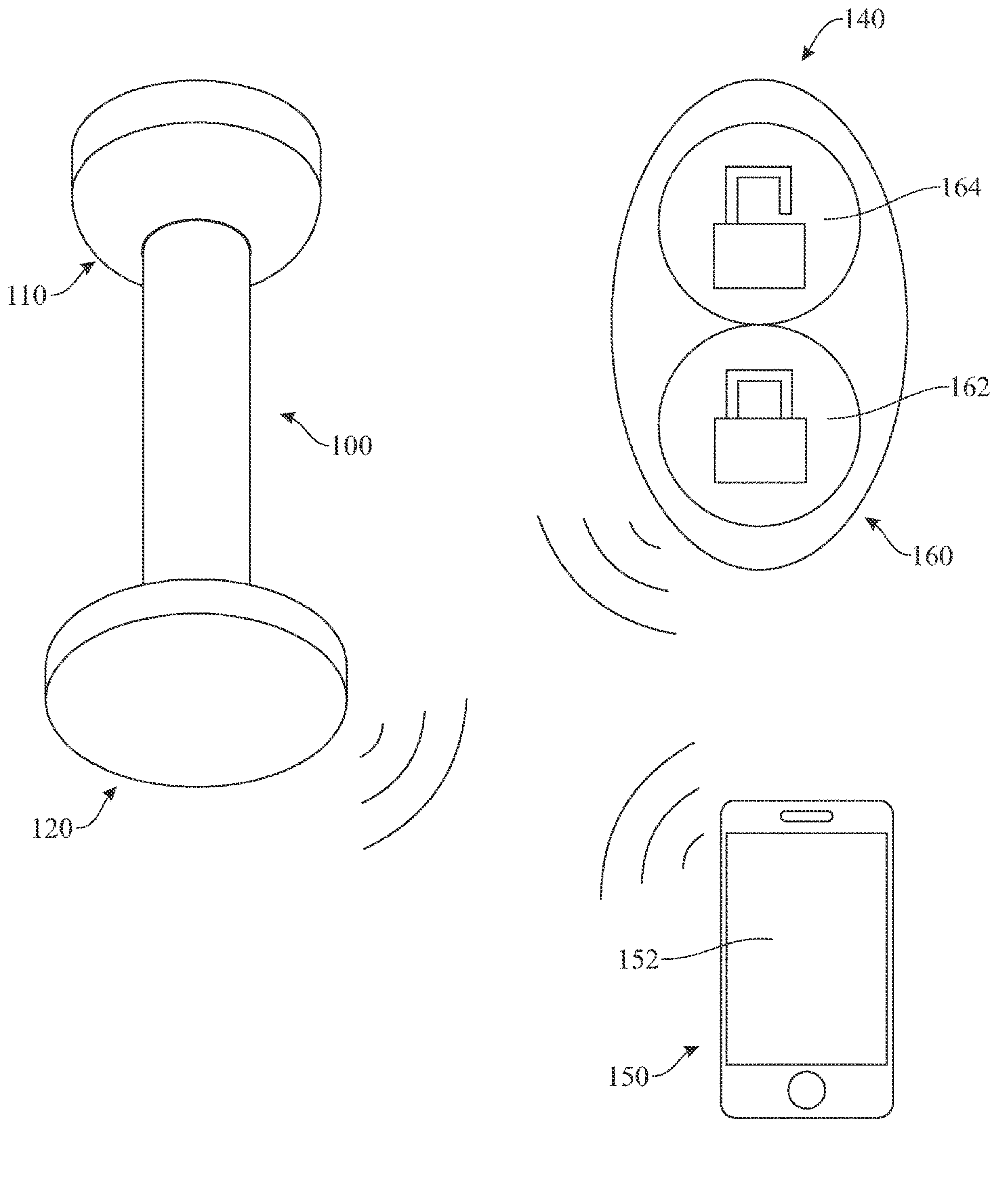
FIG. 4 illustrates a system comprising the wearable device, a user device, and a key fob, in accordance with one embodiment of the present specification.

Reference is now made to FIG. 4 that illustrates a system 140 comprising the wearable device 100, the system 140 facilitating one or more external devices to communicate and control operation of one or more components of the wearable device 100. The system 140 comprises a user device 150 and a key fob 160, both the user device 150 and the key fob 160 being communicatively coupled to the wearable device 100. It is appreciated that the system 140 may comprise communication networks that allows communication of the wearable device 100 with the user device 150 and the key fob 160. The communication networks may be any type of communication network including one or more of the Internet, local area networks (LAN), wireless networks, switch or hub connections, a telephone network (e.g., a public switched telephone (PSTN) network, a cellular network, etc.), Bluetooth network, RFID network, or the like.

In some embodiments, the user device 150 may be a device associated with the user wearing the wearable device 100. In some embodiments, the user device 150 may be a device associated with a trusted contact of the user wearing the wearable device 100. The user device 150 may be linked to the wearable device 100 so as to allow the location of the wearable device 100 to be tracked via the user device 150. The user device 150 may be any type of electronic device, e.g., desktop computer, laptop computer, portable or mobile device, cell phone, smartphone, tablet computer, personal digital assistant (PDA), or the like.

In some embodiments, the user device 150 may comprise an application, for instance a software application, which is executable to communicate with the wearable device 100, for instance, with the tracking module of the wearable device 100. In some embodiments, the application may be a web application. In some embodiments, the application may be a mobile application. The mobile application may be installed on the user device 150. In some embodiments, the user device 150 is linked to the wearable device 100 by means of the application on the user device 150. In some embodiments, the application may instruct the user device 150 to scan a QR code associated with the wearable device 100 so as to link the user device 150 with the wearable device 100. In some embodiments, the QR code may comprise a unique identifier of the wearable device 100.

Figure 5:
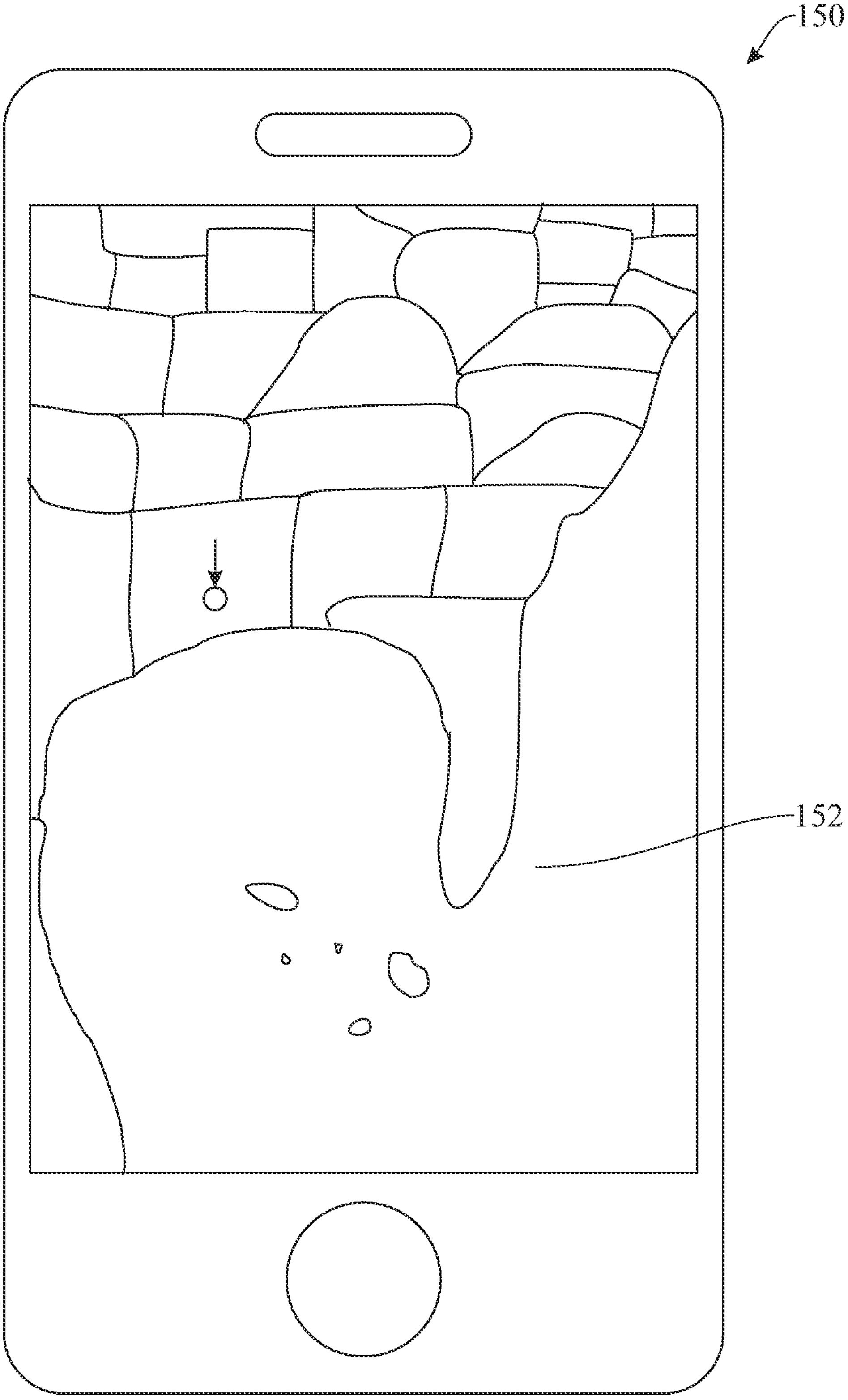
FIG. 5 illustrates the user device in communication with a tracking module of the wearable device, in accordance with one embodiment of the present specification.

Upon linking the wearable device with the user device 150, the user device 150 can receive location data from the tracking module of the wearable device. Reference is made to FIG. 5 that illustrates the user device 150 in communication with the tracking module of the wearable device 100. As seen in FIG. 5, a location of the wearable device 100, and thus a user wearing the wearable device 100, is displayed on a user interface 152 of the user device 150. In some embodiments, the location of the wearable device 100 is updated in real-time. The user interface 152 may be associated with the application running on the user device.

Referring again to FIG. 4, the key fob 160 is configured to control operation of the locking mechanism of the wearable device 100. The key fob 160 is assigned and associated to the locking mechanism such that only the associated key fob 160 may control operation of the locking mechanism of the wearable device 100. Accordingly, each wearable device 100 may have an associated key fob 160. In some embodiments, each wearable device 100 may have a primary key fob and one or more backup key fobs associated therewith.

In an embodiment, the key fob 160 may be associated and assigned to the wearable device 100 by a user of the wearable device 100, such as during a set-up procedure of the wearable device. For instance, upon an initial use of the wearable device 100, the wearable device 100 is registered and associated with the key fob 160. In an embodiment, a QR code may be utilized to associate the key fob 160 with the wearable device 100.

As described above, the key fob 160 controls operation of the locking mechanism of the wearable device 100. In particular, the key fob 160 controls the switching of the locking mechanism from the locked state to the unlocked state and vice versa. The key fob 160 comprises a lock button 162 and an unlock button 164. Upon the lock button 162 being pressed by a user, a signal is transmitted to the locking mechanism causing the locking mechanism to shift to the locked state (in case the locking mechanism was previously in the unlocked state) or stay in the locked state (in case the locking mechanism was previously in the locked state). It is appreciated that the user of the key fob 160 may be the user of the wearable device 100 or a different trusted user, such as a guardian of the user wearing the wearable device 100.

Upon the unlock button 164 being pressed by a user, a signal is transmitted to the locking mechanism causing the locking mechanism to shift to the unlocked state (in case the locking mechanism was previously in the locked state) or stay in the unlocked state (in case the locking mechanism was previously in the unlocked state). It is appreciated that the locking mechanism would be operated and controlled only with signals generated by the associated key fob 160.

Accordingly, when the lock button 162 of the associated key fob 160 is pressed, the locking mechanism is in the locked state, thus preventing the wearable device 100 to be shifted from the assembled state to the disassembled state. When the unlock button 164 of the associated key fob 160 is pressed, the locking mechanism is in the unlocked state, allowing the wearable device 100 to be disassembled, and thus being removed from the user wearing the wearable device 100.

In use, the wearable device 100 may initially be associated with the key fob 160 and the user device 150. A user may wear the wearable device 100 by placing the wearable device on the ear of the user. When the wearable device 100 is worn by the user, the wearable device 100 is in the assembled state, with the first member 110 engaged with the second member 120. As the user travels to different locations, the location of the wearable device 100 can be tracked on the user device 150, for instance, via an application installed on the user device 150.

The user may utilize the key fob 160 to operate the locking mechanism of the wearable device 100. Upon pressing the lock button 162 of the key fob 160, the locking mechanism is in a locked state. At such a state of the locking mechanism, the wearable device 100 cannot be disassembled, i.e., the first member 110 cannot be disengaged from the second member 120 and the wearable device 100 stays in the assembled state thereof, therefore the wearable device 100 cannot be removed from the user without the use of the force. When it is desired by the user to disassemble the wearable device 100, the user may press the unlock button 164 to shift the locking mechanism to the unlocked state.

When the wearable device 100 is in the assembled state, and the locking mechanism is in the locked state, any tampering of the wearable device 100 by an unauthorized person is prevented. As an example, an unauthorized person may try to disassemble the wearable device 100 worn by the user such as to prevent tracking of the wearable device 100. With the locking mechanism in the locked state, any such tampering by an unauthorized person is prevented.

Figure 8:
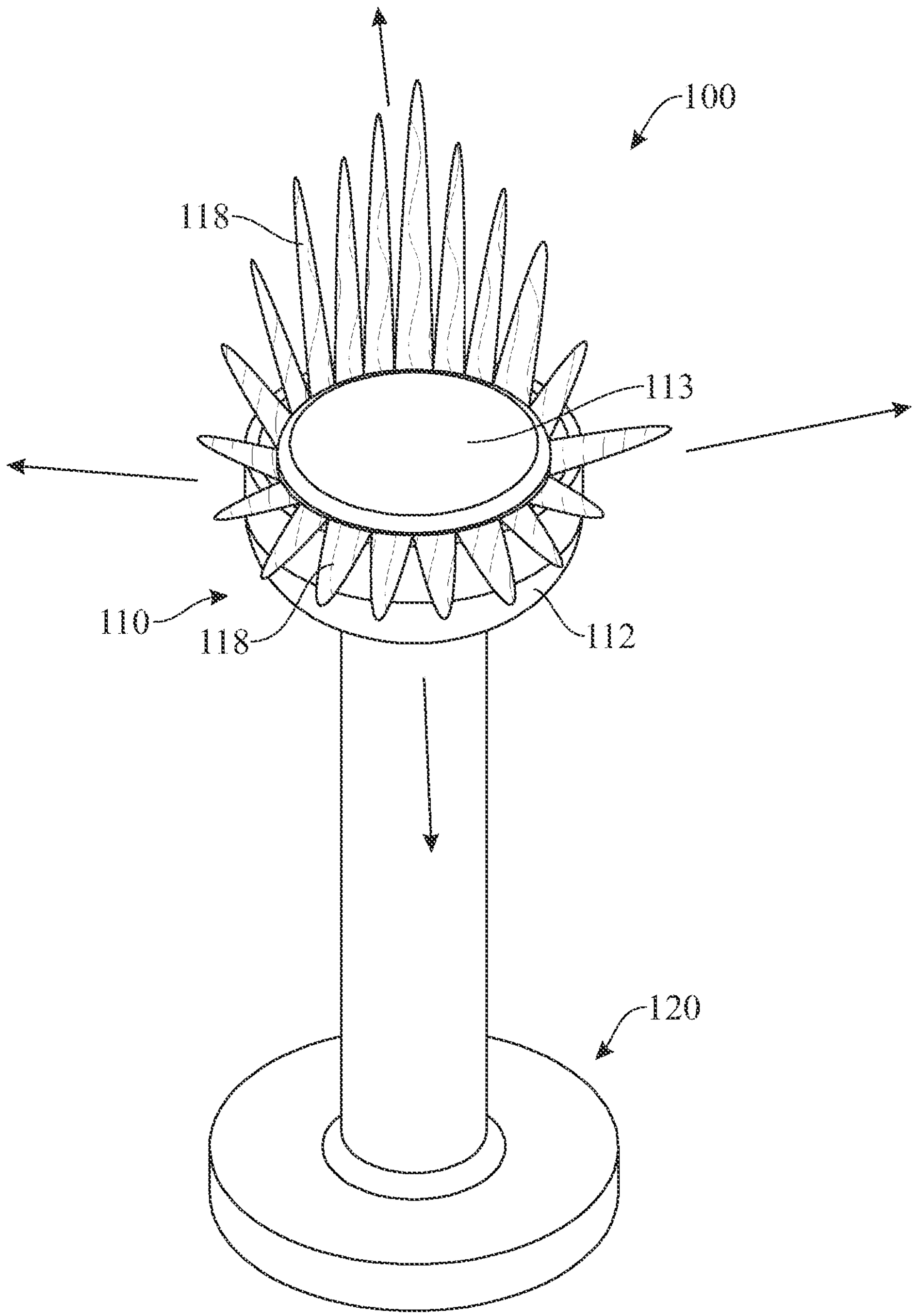
FIG. 8 illustrates the wearable device with ink being ejected out therefrom, in accordance with one embodiment of the present specification.

Additionally, in case an unauthorized person tries to mishandle the wearable device 100 or forcibly disassemble the wearable device 100, the ejection module 130 may be activated. The ejection module 130 would cause the ink 118 stored in the chamber 117 to be ejected into the passage 116, and through the opening 115, to the exterior of the wearable device 100. In particular, the ink 118 is ejected to the exterior of the first member 110 of the wearable device 100. Reference is made to FIG. 8 that illustrates wearable device 100 with the ink 118 being ejected out of the first member 110 of the wearable device 100 via the opening 115 (not visible).

As seen in FIG. 8, the ink 118 flows from the chamber 117 from within the first member 110 to the exterior of the wearable device 100. In some embodiments, the opening 115 is a circumferential opening and the ink 118 is ejected in all directions through the opening 115, i.e., in a 360 degree pattern. As the ink 118 is ejected out of the wearable device 100, the ink 118 may be sprayed onto an unauthorized person in vicinity of the wearable device 100. For instance, the ink 118 may be sprayed onto an unauthorized person trying to disassemble the wearable device 100. The ink sprayed on an unauthorized person may thus act as a silent but universal sign of the unauthorized person being a trouble maker.

In some embodiments, the ink 118 may be sprayed onto the person who is wearing the wearable device 100. For example, when the wearable device 100 is an ear ring, and someone tries to forcibly remove the wearable device 100 from the ear of the user, the ink 118 may spray onto the ear of the user, which may be indicative of that the user needs help.

In some embodiments, the ejection module 130 may cause the ink 118 to spray out in a particular pattern (e.g., when the device 100 is being forcibly removed from a person wearing it), the particular pattern being a sign of danger, help, or emergency.

Such a silent sign is extremely helpful in cases of human trafficking and child abductions where a user may be forcibly taken to different locations. The wearable device would provide a two-fold advantage in that the tamper-proof device would transmit the live location to a remote user device for tracking, and further, any forced tampering would cause injection of the ink onto the unauthorized person. The ink stains on the unauthorized person would be readily visible and it would be easier for officials and general public to detect and catch the unauthorized person.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A wearable device comprising:

a first member having a circumferential opening and a second member configured to be detachably engaged with the first member through a threaded engagement and unthreaded engagement between the first member and the second member;

a chamber comprising liquid ink, the liquid ink being in fluid communication with the circumferential opening via a passage extending between the chamber and the circumferential opening;

a locking mechanism configured to switch between a locked state in the threaded engagement of the first member with the second member and an unlocked state in the unthreaded engagement of the first member with the second member;

a sealing element capable of having a sealed state and a ruptured state and configured to prevent the liquid ink contained within the chamber from leaking to the passage when in the sealed state, wherein the sealing element is configured to rupture when a predetermined force is exerted thereon while in the sealed state thereby switching to the ruptured state;

an ejection module positioned within either the first member or the second member and comprising an ejector and a battery, the ejection module operatively connected to the locking mechanism and comprising an ejector operatively coupled to the battery and configured to eject the liquid ink through the circumferential opening of the first member when the locking mechanism is at the locked state thereof and wherein the ejector is configured to provide the liquid ink with sufficient energy to rupture the sealing element thereby causing a transitioning of the sealing element from the sealed state to the ruptured state and ejecting the liquid ink in all directions in a 360 degree pattern such that the ejection module is activated when the locking mechanism is in the locked state thereof and deactivated when the locking mechanism is in the unlocked state thereof; and wherein the wearable device inhibits episodes of tampering when worn by an individual.

2. The wearable device of claim 1, wherein the tracking module further comprises:

a transceiver configured to receive satellite signals and transmit location data indicative of the location of the wearable device; and a processing unit configured for analyzing the satellite signals received by the transceiver and determining the location of the wearable device.

3. A wearable device comprising:

a first member having a circumferential opening and a second member configured to be detachably engaged with the first member through a threaded engagement and unthreaded engagement between the first member and the second member;

a chamber comprising liquid ink, the liquid ink being in fluid communication with the circumferential opening via a passage extending between the chamber and the circumferential opening;

a locking mechanism configured to switch between a locked state in the threaded engagement of the first member with the second member and an unlocked state in the unthreaded engagement of the first member with the second member;

a sealing element capable of having a sealed state in which fluid communication between the chamber and the liquid ink contained therein is prevented, and a ruptured state in which fluid communication between the chamber and the liquid ink contained therein is allowed, and wherein the sealing element is configured to rupture when a predetermined force is exerted thereon while in the sealed state thereby transitioning to the ruptured state;

an ejection module comprising an ejector configured to provide the liquid ink with sufficient energy to rupture the sealing element thereby causing the transitioning from the sealed state to the ruptured state and to eject the liquid ink in all directions in a 360 degree pattern through the circumferential opening of the first member when the locking mechanism is at the locked state thereof; and wherein the wearable device inhibits episodes of tampering when worn by an individual.

4. The wearable device of claim 3, wherein the ejection module is operatively connected to the locking mechanism.

5. The wearable device of claim 4, wherein the ejection module is activated when the locking mechanism is in the locked state thereof and deactivated when the locking mechanism is in the unlocked state thereof.

6. The wearable device of claim 3, wherein the wearable device further comprises:

a tracking module configured to transmit a location of the wearable device.

7. The wearable device of claim 6, wherein the tracking module is positioned within either the first member or the second member.

8. The wearable device of claim 3, wherein the ejection module is positioned within either the first member or the second member.

9. The wearable device of claim 6, wherein the tracking module is a Global Positioning System (GPS) module.

10. The wearable device of claim 6, wherein the tracking module further comprises:

a transceiver configured to receive satellite signals and transmit location data indicative of the location of the wearable device; and a processing unit configured for analyzing the satellite signals received by the transceiver and determining the location of the wearable device.

11. The wearable device of claim 3, wherein the liquid ink is a permanent ink.

12. The wearable device of claim 3, wherein the sufficient energy is in a kinetic energy form.

13. The wearable device of claim 3, wherein the ejection module further comprises:

a battery operatively coupled to the ejector, wherein the ejector is configured to provide the liquid ink with the sufficient energy to rupture the sealing element thereby causing a transitioning of the sealing element from the sealed state to the ruptured state.

14. The wearable device of claim 3, wherein the circumferential opening is divided into a plurality of openings and the passage is divided into a plurality of passages corresponding to the plurality of openings.

15. The wearable device of claim 3, wherein the wearable device is an ear ring.

16. A wearable device comprising:

a first member having a circumferential opening and a second member configured to be detachably engaged with the first member through a threaded engagement and unthreaded engagement between the first member and the second member;

a chamber comprising liquid ink, the liquid ink being in fluid communication with the circumferential opening via a passage extending between the chamber and the circumferential opening;

a locking mechanism configured to switch between a locked state in the threaded engagement of the first member with the second member and an unlocked state in the unthreaded engagement of the first member with the second member;

a sealing element capable of having a sealed state in which fluid communication between the chamber and the liquid ink contained therein is prevented, and a ruptured state in which fluid communication between the chamber and the liquid ink contained therein is allowed, and wherein the sealing element is configured to rupture when a predetermined force is exerted thereon while in the sealed state thereby transitioning to the ruptured state;

an ejection module operatively connected to the locking mechanism and comprising an ejector configured to provide the liquid ink with sufficient energy to rupture the sealing element thereby causing the transitioning from the sealed state to the ruptured state and to eject the liquid ink in all directions in a 360 degree pattern through the circumferential opening of the first member when the locking mechanism is at the locked state thereof; and wherein the wearable device inhibits episodes of tampering when worn by an individual.

17. The wearable device of claim 16, wherein the ejection module further comprises:

a battery operatively coupled to the ejector coupled to the battery, wherein the ejector is configured to provide the liquid ink with the sufficient energy to rupture the sealing element thereby causing a transitioning of the sealing element from the sealed state to the ruptured state such that the ejection module is activated when the locking mechanism is in the locked state thereof and deactivated when the locking mechanism is in the unlocked state thereof.

18. The wearable device of claim 16, wherein the circumferential opening is divided into a plurality of openings and the passage is divided into a plurality of passages corresponding to the plurality of openings.

* * * * *